US006308816B1

(12) United States Patent
Bankuty et al.

(10) Patent No.: US 6,308,816 B1
(45) Date of Patent: Oct. 30, 2001

(54) ROTARY ORIENTER INDEXING SYSTEM

(75) Inventors: Geza E. Bankuty, Holmes Beach; Nicholas J. Perazzo, Sarasota, both of FL (US)

(73) Assignee: New England Machinery, Inc., Bradenton, FL (US)

( * ) Notice: Subject to any disclaimer, the term of this patent is extended or adjusted under 35 U.S.C. 154(b) by 0 days.

(21) Appl. No.: 09/502,262

(22) Filed: Feb. 11, 2000

(51) Int. Cl.[7] .................................................. B65G 43/08
(52) U.S. Cl. ........................................ 198/395; 198/377.1
(58) Field of Search ................................. 198/395, 377.1, 198/377.07

(56) References Cited

U.S. PATENT DOCUMENTS

| 2,426,433 | 8/1947 | Carter ...................................... 198/33 |
| 3,934,714 | 1/1976 | Matsumoto ........................... 194/244 |
| 4,124,112 | 11/1978 | Mohney et al. ...................... 198/344 |
| 4,428,474 | * 1/1984 | Gau et al. ............................ 198/394 |
| 4,606,244 | 8/1986 | Schneemann ........................ 198/244 |
| 4,993,537 | * 2/1991 | Bianchini et al. .................... 198/395 |
| 5,150,782 | 9/1992 | Richter ................................. 198/394 |

* cited by examiner

*Primary Examiner*—Christopher P. Ellis
*Assistant Examiner*—Joe Dillon, Jr.
(74) *Attorney, Agent, or Firm*—Pettis & Van Royen, P.A.

(57) ABSTRACT

An indexing system for rotary orienters for positioning articles so that a feature of each article is facing in the same predetermined direction so that further operations may be accurately performed on the articles. The rotary orienter may be used in conjunction with filling, capping, labeling and inspection of containers, or other similar operations. The apparatus comprises a support frame to which is mounted a central column that is rotatable about its axis by a rotating means. The rotary orienter has at least one station that comprises a rotatable spindle to which a turntable is attached to one end and an indexing assembly is attached proximal the other end. The indexing assembly comprises a slip clutch and a means for rotating the spindle that is mounted proximal the second of the spindle. An indexing wheel, that has at least two detents formed therein, is mounted on the spindle intermediate the turntable and the slip clutch. The first end of an arm is pivotally mounted to the support frame and the arm is engageable with the detents of the indexing wheel so that when it is so engaged the indexing wheel and the spindle is prevented from rotating with the means for rotating the spindle. An actuator is connected to the support frame so that when it engages the arm, the arm disengages from one of the detents, thereby allowing the turntable to rotate until the arm is released by the actuator and the arm engages the other one of the detents.

6 Claims, 9 Drawing Sheets

ROTARY ORIENTER INDEXING SYSTEM

BACKGROUND OF THE INVENTION

1. Field of the Invention

The present invention relates to indexing systems for rotary orienters. Rotary orienters position articles being conveyed on a conveyor system so that a feature of each article is facing in the same predetermined direction, for example, with a handle leading. The invention is directed to an improved apparatus for indexing the rotation of articles, rotating them rapidly but smoothly to a precise predetermined orientation about their vertical axis. The apparatus may be used in conjunction with filling, capping, labeling and inspection of containers, or other similar operations.

2. Description of the Prior Art

The packaging industry handles many different articles that must be packaged, filled, processed, or acted on in some manner. These articles are made in many different sizes and shapes that are not necessarily symmetrical. They may have a handle and/or an opening, and so forth, that is off center. In the packaging industry, the articles may require that a label be applied to a particular side, or that a product be inserted through an opening in the article, or some other requirement that necessitates the articles being oriented in a uniform manner while being processed along a production line. It is then necessary to index the opening of the articles to be filled so that the opening of each article is uniformly aligned with the filling spout. The articles may be introduced to a linear conveyor system with these key features randomly oriented; for example, the opening into a container. Therefore, it becomes necessary to rotate the articles until the selected feature is in the same precise location in relation to each other and in relation to the production equipment. An indexing system is critical to ensure the rotation of the article is to the same precise orientation so that the next apparatus in the production line may operate on the article with the same result.

Various apparatus for orienting articles, which use various indexing methods, are well-known in the packaging industry. The patent to Schneemann, U.S. Pat. No. 4,606,244, illustrates a complex apparatus for incrementally rotating a turntable from one workstation position to another. This apparatus is actuated by a linearly translating driver. The primary purpose of the apparatus is to firmly lock the turntable with a locking pawl at each workstation The apparatus does not permit selective rotation and is overly complex for use in orienting articles.

U.S. Pat. No. 3,934,714, issued to Takao Matsumoto, uses a friction wheel attached to the rotatable table that selectively engages a centrally driven friction wheel for rotation of the table. A detection device issues a signal to the indexing system to initiate rotation. A terminating signal frees the friction wheel of the rotatable table from the central friction wheel. An electromagnetic brake is used to stop the rotation of the rotatable table in response to the terminating signal. The use of friction wheels and electromagnetic brakes provide a system that is imprecise.

U.S. Pat. No. 3,957,154 discloses yet another method for rotation of containers, however this rotation is for inspection or labeling purposes of round containers and precise positioning is unnecessary.

Notwithstanding the existence of such prior art indexing systems, it remains clear that there is a need for a rotary orienter having an indexing system that will permit smooth and precise rotation of an article to a predetermined position to enable further production steps to be precisely undertaken.

SUMMARY OF THE INVENTION

The present invention relates to a rotary orienter having an indexing system that smoothly and accurately rotates articles to a predetermined orientation so that further operations may be accurately performed on the articles. The rotary orienter receives randomly oriented articles from a standard linear conveyor system through an entrance star wheel that places the articles on at least one station that is rotated about a central axis of a turret assembly. Each article is rotated by the station, about the station's axis, to a uniform predetermined orientation. The articles then depart the rotary orienter through an exit star wheel that places the articles on the exit linear conveyor system.

Most simply stated, the invention comprises a support frame to which is mounted a central column that is rotatable about its axis by a rotating means. There is at least one station that is connected to the column and rotates with the column as the column rotates about its axis.

The station comprises a spindle that has a first end and a second end. The spindle is rotatable about its longitudinal axis by means for rotating the spindle. A turntable is attached to the first end of the spindle. The means for rotating the spindle is connected to the spindle proximal the second end of the spindle and it is also connected to the support frame. An indexing assembly is attached to the spindle and to the support frame of the rotary orienter.

The indexing assembly comprises a slip clutch that is mounted on the spindle proximal the means for rotating the spindle. An indexing wheel, that has at least two detents formed therein, is mounted on the spindle intermediate the turntable and the slip clutch. The first end of an arm is pivotally mounted to the support frame so that the second end extends outwardly in relation to the column. The arm is engageable with the detents of the indexing wheel so that when it is so engaged the indexing wheel and the spindle are prevented from rotating when the means for rotating the spindle rotates. An actuator is connected to the support frame so that it is engageable with the arm. When the actuator engages the arm, the arm disengages from one of the detents, thereby allowing the turntable to rotate until the arm is released by the actuator and the arm engages the other one of the detents.

The rotary orienter further comprises a means for moving articles onto the turntable in generally random orientation. At least one sensor is mounted to the support frame for determining the orientation of the article that has been placed upon the turntable. The sensor activates the actuator when orientation of an article is not in accordance with the predetermined orientation.

The invention accordingly comprises an article of manufacturer possessing the features, properties, and the relation to elements which will be exemplified in the article hereinafter described, and the scope of the invention will be indicated in the claims.

BRIEF DESCRIPTION OF THE DRAWINGS

For a fuller underside of the nature and objects of the invention, reference should be had to the following detailed description taken in connection with the accompanying drawings in which.

Similar reference characters refer to similar parts throughout the several views of the drawings.

DESCRIPTION OF A PREFERRED EMBODIMENT

A preferred embodiment of the rotary orienter of this invention is illustrated in the drawing FIGS. 1–12. The rotary orienter is indicated generally as 10 in FIGS. 1 and 2 and the objects upon which the rotary orienter will act, are indicated as 12 in FIGS. 1, 2, and 3. For ease of illustration, the objects shown are four sided containers 12 having an open handle 14 that projects from the neck of the container generally perpendicular to one of the sides of the container 12. With proper adjustment, the rotary orienter 10 will operate upon many different objects having different shapes, including containers having a circular cross-section and those having a plurality of sides, including but not limited to, triangular, square and rectangular.

Figure 1:
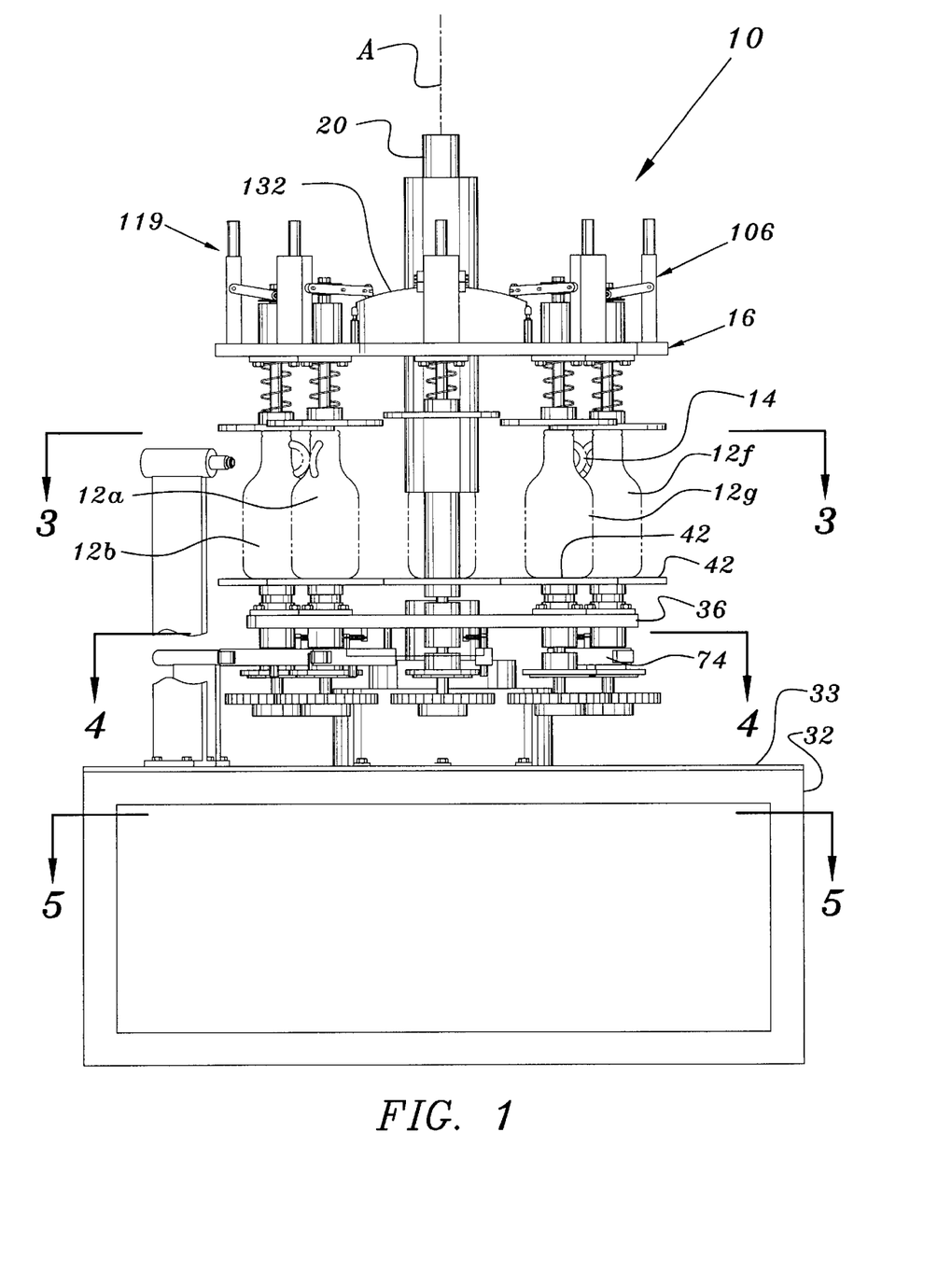
FIG. 1 is a front elevation of the rotary orienter of this invention.
Figure 2:
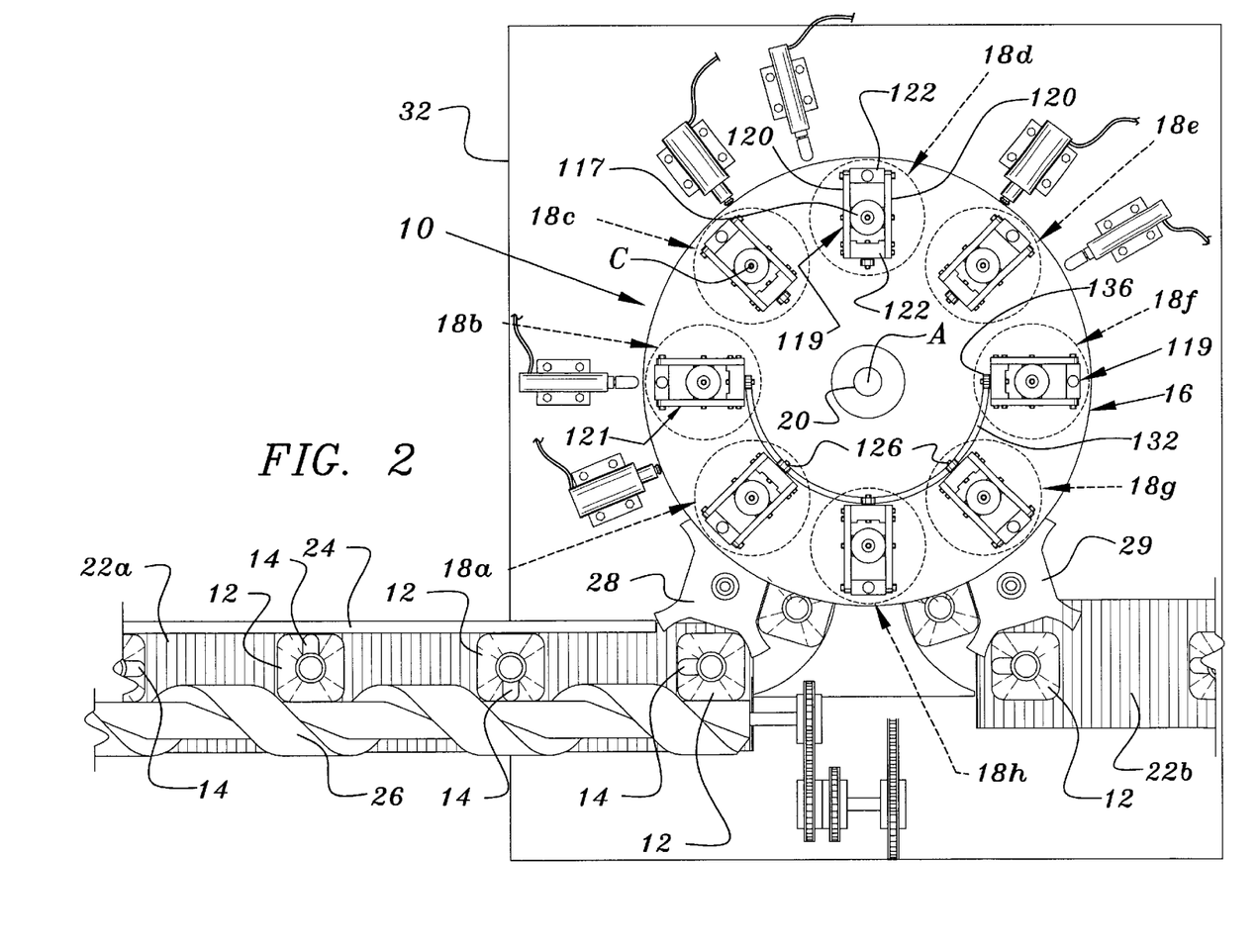
FIG. 2 is a plan of the invention of FIG. 1 further illustrating the conveyor system.
Figure 3:
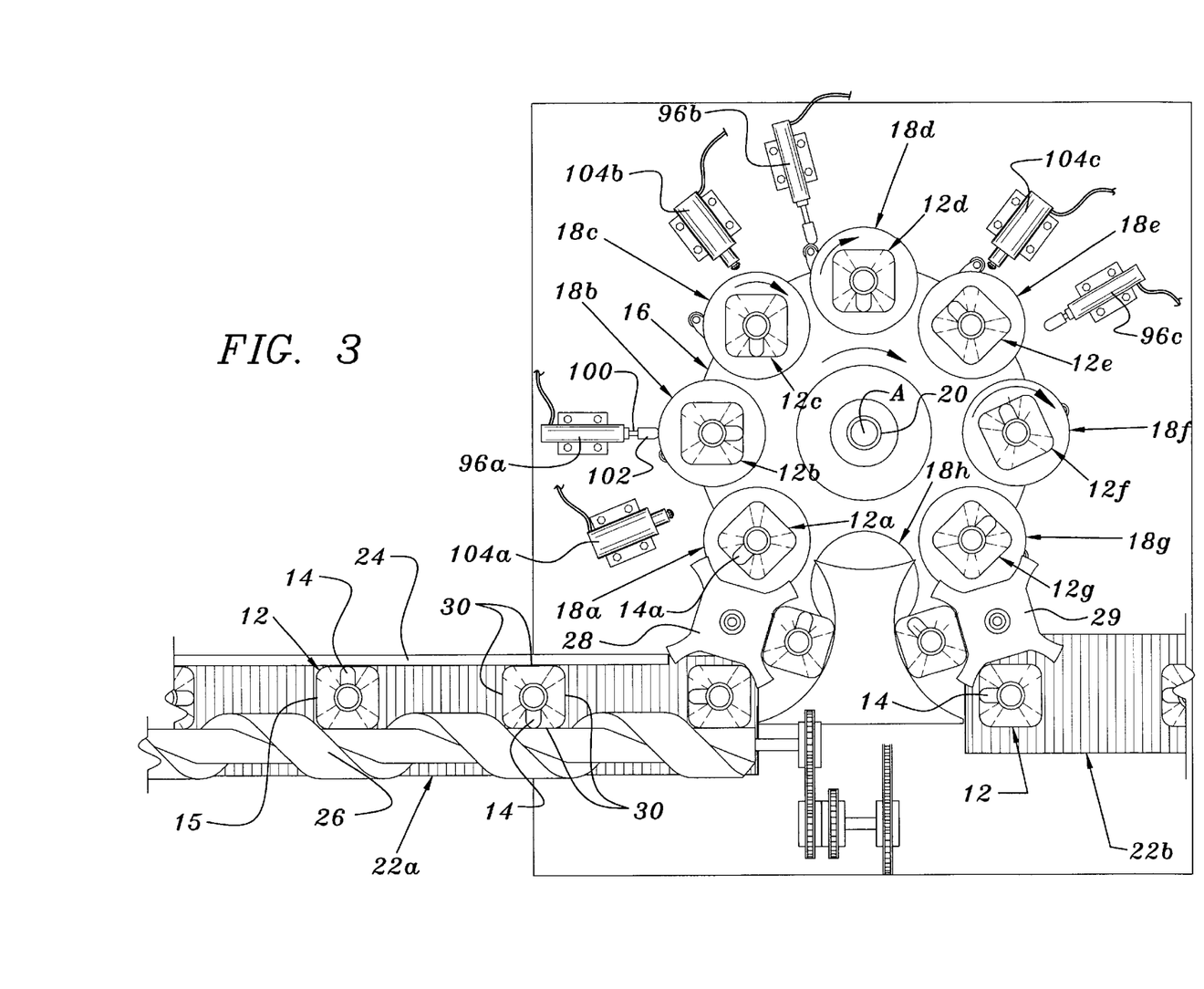
FIG. 3 is a cross-sectional plan of the invention of FIG. 1 taken along line 3—3 of FIG. 1, including the conveyor system.

As can be seen in FIG. 1, and more clearly in FIG. 2 and FIG. 3, the turret assembly 16 of the rotary orienter 10, of this illustrated embodiment, has eight stations 18a–h configured about a central column 20. In other embodiments, there may be as many or few stations as is suitable for the purpose of the rotary orienter 10. As seen in FIG. 2 and more clearly in FIG. 3, a linear entrance conveyor 22a receives containers 12 in random orientation, with the handle 14 being, in this example, the primary indicator of improper orientation. In other examples, it may be the location of the opening, it may be labels attached to the containers 12, or a specific shape that is formed in the containers 12 that identifies a particular orientation. A guide 24 keeps the containers on the entrance conveyor 22a as a screw feeder 26 spaces the containers 12 from each other and then advances the containers 12 to an entrance star wheel 28. In this preferred embodiment, the containers 12 have generally equal sides 30, so that the containers may be oriented by the conveyor system 22 in any one of four positions. Three of these positions will be incorrect and one will be correct. In other embodiments, the containers may be rectangular with two long sides and two short sides so that the conveyor system 22 will orient the containers in either of two positions, one of which is correct and the other one is not. In an embodiment processing triangular containers, the conveyor system 22 will position one of the container's sides away from the screw feeder, which will be constructed to receive a triangular shape. A triangular container will have two incorrect positions and one correct position.

To properly orient the containers in these various embodiments, the rotary orienter 10 must rotate the containers through the appropriate number of degrees. For example to orient a rectangular container will only require a single rotation of 180 degrees if the container is oriented incorrectly. A triangular container will be rotated in 120 degree increments until the container is determined to be correctly positioned. A square container will be to be rotated in 90 degree increments until the container is determined to be correctly positioned.

Figure 6:
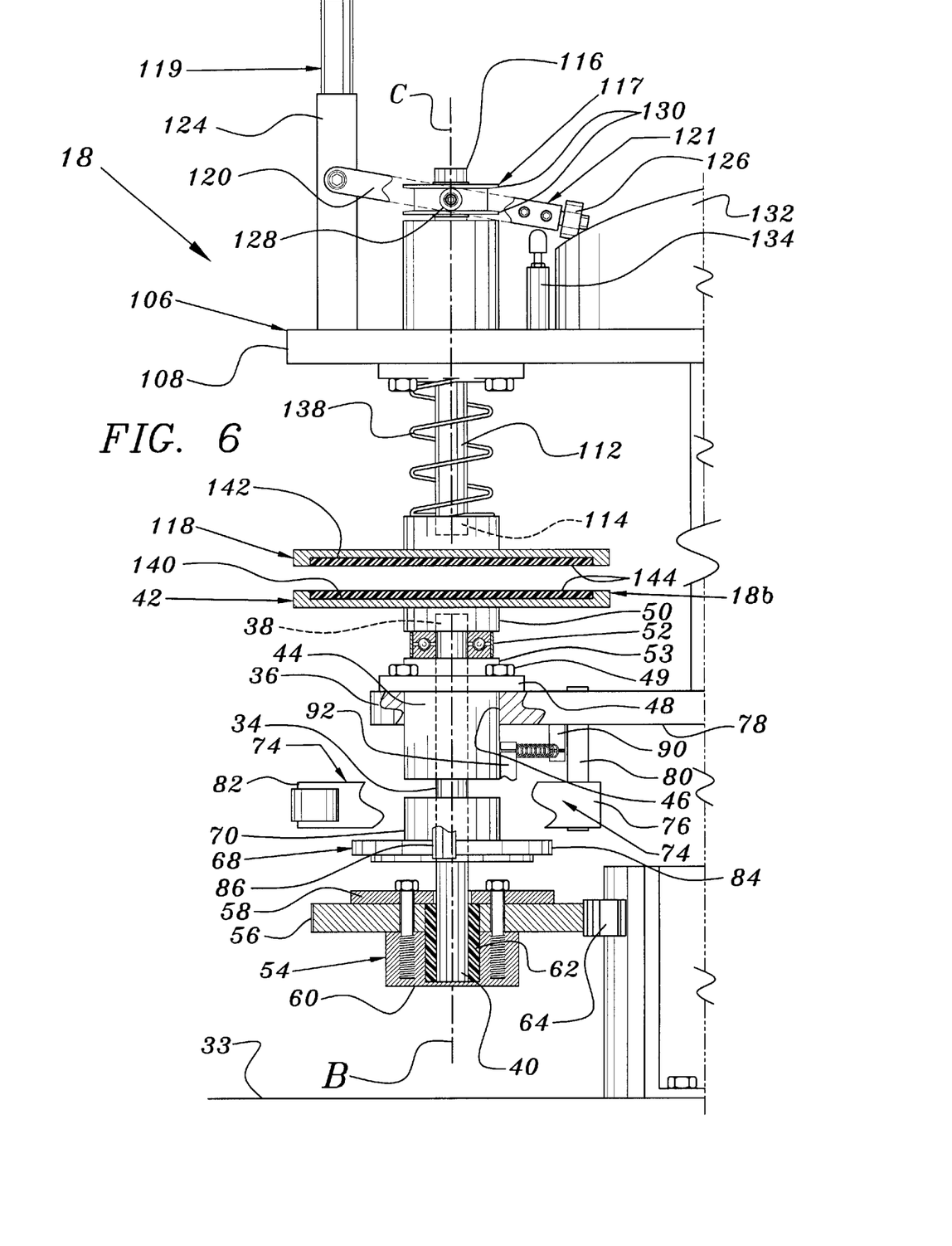
FIG. 6 is a detailed elevation of one station of the rotary orienter of FIG. 1, showing a portion broken away for convenience.

The rotary orienter 10, in the embodiment illustrated, is capable of rotating a container 12 through three 90 degree increments, for a total of 270 degrees of rotation. As seen in FIG. 3 the illustrated embodiment of the turret assembly 16 comprises eight stations 18a–h. As shown in FIG. 1, the turret assembly 16 is mounted to a support frame 32 that includes a horizontal surface 33. The support frame 32 is generally constructed from steel to support the weight of the turret assembly 16. The central column 20 is bolted or welded to the horizontal surface 33. As shown in FIG. 6, each station 18a–h comprises a spindle 34, which has a longitudinal axis B. The spindle 34 connected to the central column 20 for rotation of each station about the central column's longitudinal axis A. Each spindle 34 is mounted to and extends through a plate 36 so that the spindle 34 may be rotated about its longitudinal axis B by a spindle rotating means. For convenience the plate 36 is circular and the spindles are mounted equidistant from the longitudinal axis A for proper interaction with the entrance star wheel 28 and the exit star wheel 29. The plate 36 is mounted to the central column 20 by welding or by other well-known means. For example, in other embodiments, the plate 36 may be may be welded to a sleeve (not shown) that is keyed or bolted to the central column 20. Each spindle 34 has a first end 38 and a second end 40.

Each station 18a–h further comprises a turntable 42 that is attached to the first end 38 of the spindle 34 by a set screw, bolting, welding or by other well-known means. The spindle 34 is mounted to the plate 36 by a radial bearing 44, which is used to stabilize the spindle 34 and permit it to rotate freely within the radial bearing 44. The radial bearing 44 is mounted through a hole 46 in the plate 36 and the flange 48 of the radial bearing 44 is bolted by bolts 49 to the plate 36. The hub 50 of the turntable 42 rests upon a thrust bearing 52 that is attached to a spacing collar 53 and the flange 48 of the radial bearing 44 for free rotation of the upper ion of the radial bearing 44 along with the turntable 42. The spacing collar 53 is simply used to adjust the final height of the turntable 42 to ensure it is level with the entrance and exit star wheels 28 and 29 respectively. In other embodiments, the spacing collar 53 may not be necessary and the bottom of the thrust bearing will be bolted directly to the radial bearing flange 48.

Figure 4:
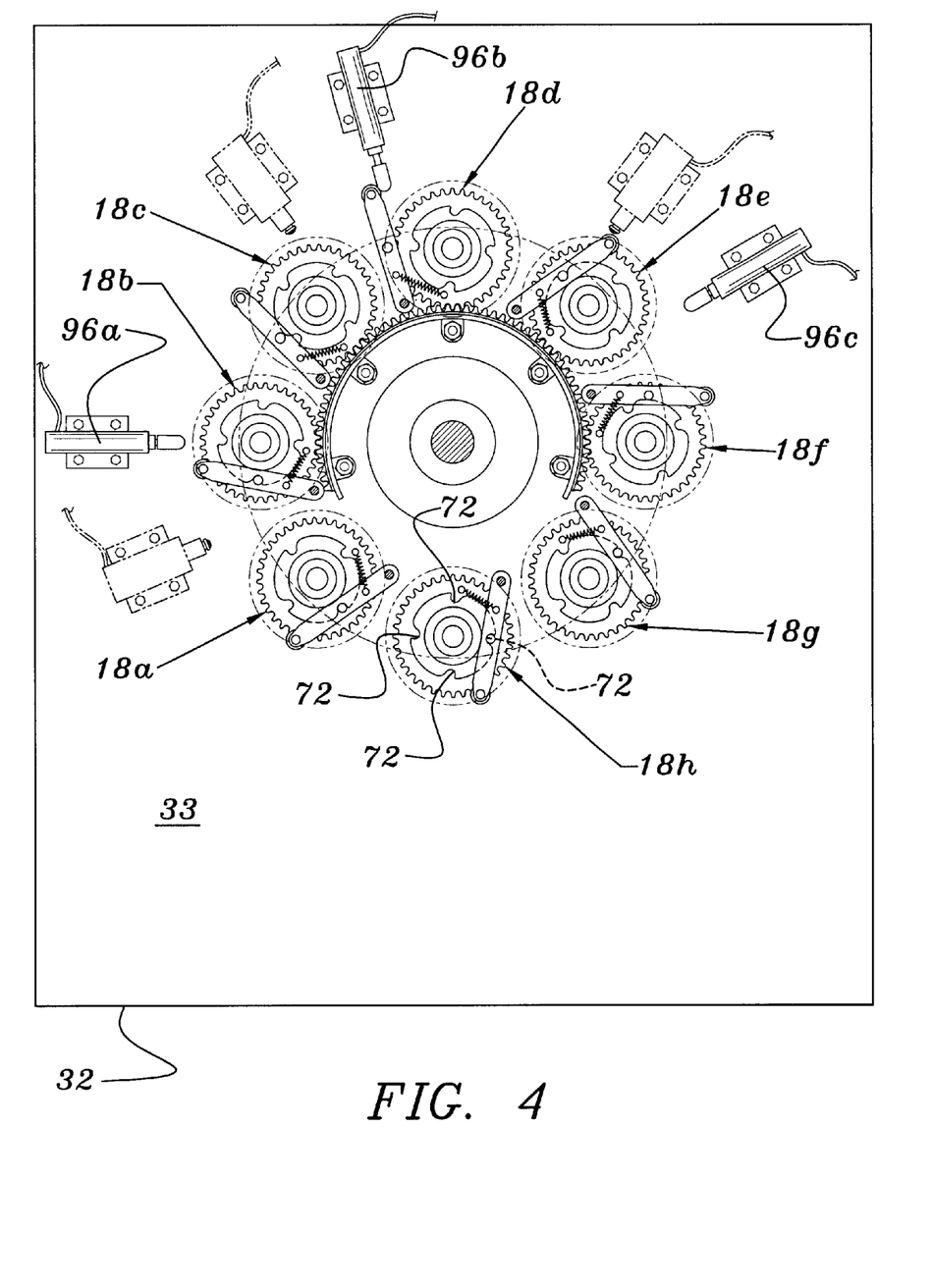
FIG. 4 is a cross-sectional plan of the invention of FIG. 1 taken along line 4—4 of FIG. 1.

A means for rotating the spindle 34 is connected to the support frame 32 and to the spindle 34. In this embodiment, the means for rotating the spindle 34 comprises a slip clutch 54. that is mounted proximal to the second end 40 of the spindle 34, and a gear 56, that is mounted to the slip clutch so that when the spindle 34 is prevented from rotating, the gear 56 may continue to rotate once it overcomes the resistance of the slip clutch 54. The gear 56 is bolted between a hub 58 and the outer portion 60 of the slip clutch 54. The second end 40 of the spindle 34 is attached to the inner portion 62 of the slip clutch 54. The slip clutch should be set for between 5 and 10 inch-pounds of torque for the majority of applications of the rotary orienter 10. The slip clutch 54 may be any well-known slip clutch that is suitable for the purpose, for example a model No. L4-1-312A Hilliard slip clutch would be suitable in most cases. The gear 56 is preferably made from nylon, but may be made from other plastics or metals. The means for rotating the spindle 34 further comprises gear teeth, a flexi-rack 64, conveniently mounted to a support member 66 which is bolted to the horizontal surface 33 of the support frame 32. The flexi-rack 64 is positioned so that the teeth of the gear 56 will engage the teeth of the flexi-rack 64 as the station 18 rotates about the central column 20. The teeth of gear 56 and the teeth of the flexi-rack 64 must be comparable (have the same pitch and preferably the same size for proper engagement of the teeth of the gear 56 with the teeth of the flexi-rack 64). As seen in FIG. 4, the flexi-rack 64 extends only for a portion of the circumference about the central column 20. The length of the flexi-rack 64 need be only as long as required by the maximum number of rotations needed to orient the article 12. For example, if the article has only two possible orientations only one rotation of 180 degrees will be required and only a short length of flexi-rack 64 will be needed. In the example illustrated in FIG. 4, there are four possible orientations and up to three rotations of 90 degrees each, requiring a longer segment of flexi-rack 64. As long as the gear 56 engages the flexi-rack 64, the gear 56 will rotate the spindle 34, if the spindle 34 is free to rotate. This is an efficient and dependable method for rotating the spindle 34, but it is just one means that is available. Those skilled in the art may fashion other methods, for example using timing belts and planetary gears. The flexi-rack 64 may be positioned on the outer perimeter of the rotary orienter 10; however placement in the interior position, as disclosed in FIG. 4 and FIG. 6 results in greater accuracy and a smoother operation. The flexi-rack is preferably made from acetal plastic.

An indexing wheel 68 is mounted to the spindle 34 intermediate the gear 56 and the radial bearing 44. The indexing wheel 68 is attached, by bolting or other suitable means, to an indexing hub 70 that is attached to the spindle 34 by bolting, or a set screw, or other suitable means. The indexing wheel 68 has at least two detents 72 formed in the outer periphery of the indexing wheel. The number of detents 72 correlate with the number of possible orientations of the container. For example, a rectangular container having two possible orientations will require 2 detents 72 formed at 180 degree intervals, so that the turntable 42 rotates in 180 degree segments. A generally square container having four possible orientations (as illustrated in FIG. 4) has 4 detents 72 formed at 90 degree intervals so that the turntable 42 rotates in 90 degree segments. The indexing wheel 68 is preferably made from polyurethane to reduce noise created during operation of the rotary orienter 10.

An arm 74, has a first end 76 that is pivotally mounted to the bottom surface 78 of the plate 36 by a post 80. The second end 82 of the arm 74 extends outwardly, in relation to the central column 20, so that the arm 74 may engage the peripheral edge 84 of the indexing wheel 68 and the indexing wheel detents 72. When the arm 74 engages a detent 72 the indexing wheel 68 is prevented from rotating, which prevents the spindle 34 and the attached turntable 42 from rotating. In this embodiment the arm 74 further comprises a projection 86 that extends therefrom, so that when the arm 74 is aligned proximal to the peripheral edge 84 of the indexing wheel 68, the projection 86 is engageable with the peripheral edge of the indexing wheel 68 and the detents 72 formed therein. As best seen in FIGS. 7–12, the arm 74 is biased toward the indexing wheel 68 by a spring 88 that has one end attached to a first peg 90, that is attached to the bottom surface 78 of plate 36, and a second peg 92 that is attached to the arm 74. A wheel 94 may be rotatably attached to the second end 82 of the arm 74 so that it extends outwardly therefrom.

As seen in FIG. 4 and FIGS. 7–12 an actuator 96 is connected to the horizontal surface 33 of the support frame 32 for engagement with the arm 74. The actuator 96 selectively engages the arm 74 so that the arm 74 disengages from the detent 72 allowing the indexing wheel 68 to rotate. As soon as the actuator 96 releases the arm 74 from engagement with a detent and the indexing wheel 68 rotates, the actuator releases the arm 74 so that the arm 74 engages the peripheral edge 84 of the indexing wheel 68. As the indexing wheel 68 continues to rotate the arm 74 engages the next detent 72 locking the indexing wheel to prevent rotation. In this embodiment, the actuator 96 comprises a single acting pneumatic or hydraulic cylinder 98 having a piston 100 that extends outwardly when the pneumatic cylinder 98 is activated. The actuator 96 is so aligned that upon activation of the pneumatic cylinder 98, the first end 102 of the piston 100 is extended outwardly and engages the second end 82 of the arm 74. As the station 18 rotates about the central column 20 the arm 74 is held by the actuator 96 until the arm 74 releases the indexing wheel 68. For smooth operation, the first end 102 of the piston 100 engages the wheel 94 that is attached to the second end 82 of the arm 74.

At least one sensor 104 is mounted to the support frame 34 for determining the orientation of an article, when the article is placed on a turntable 18a–h. If the sensor 104 determines that the orientation is incorrect, the sensor activates the actuator in order to release the turntable for rotation. The sensor 104 may be of any well-known type, including but not limited to, photo-electric, laser, bar-code readers, and vision systems that use cameras to measure differences in light and dark patterns or "smart cams" that measure and compare the pixels with a standard. Those skilled in the art will be able to determine the best sensor to use in relation to the particular article or container being oriented and the circuitry for connecting the sensor to the sensor 104.

Stabilization of the article or container being oriented is often necessary. When an article is heavy enough, it will maintain its position on the turntable 42 during orientation without additional support. As shown in FIG. 1 and FIG. 6, if the article is light and easily tipped over, at least one means for stabilizing the articles 106 is necessary. As seen in FIG. 1, a stabilizing means 106 is provided in conjunction with each station, so that a stabilizing means 106 overlies each turntable 42. As seen most clearly in FIG. 6, the stabilizing means comprises a circular upper plate 108 that is mounted to the support frame 32 and is spaced apart from plate 36. A radial bearing 110 projects upwardly through a hole in the upper plate 108 and its flange is bolted to the upper plate 108. A shaft 112 having a first end 114 and a second end 116 extends through the radial bearing 110 so that its longitudinal axis C is generally coincidence with the longitudinal axis B of the spindle 34. The first end 114 is attached to a platen 118 that is sized and configured so that it overlies the turntable 42. It is not necessary that the platen 118 have the same diameter as the turntable 42; however, it must be large enough to grip the top of the article or container 12. The platen 118 is raised by a lifting means 119, as seen in FIG. 2 and FIG. 6, that is attached to the second end 116 of the shaft 112. The lifting means 119 comprises a spool 117 mounted on the second end 116 of the shaft 112. A rectangular frame 121 comprising a pair of arms 120 and a pair of cross members 122 is pivotally attached by one of its cross members 122 to a vertical element 124 that is attached to the upper plate 108. To the outer side of the other cross member 122 is attached a cam follower 126. On the interior of each arm 120 is attached a rotatable wheel 128 which is captured between the rims 130 of the spool 117. A cam 132 is mounted concentrically about axis A of the central column 20. The cam 132 is used to raise the platen 118 to permit containers to be placed upon or removed from the platform 42. Therefore, the cam 132 comprises only a segment of a full circle. The inner cross member 122 to which the cam follower 126 is attached rests upon a cam follower support 134 when the cam follower disengages from the cam 132 to prevent the cam follower 126 from dropping below the beginning edge 136 of the cam 132. A spring 138 is mounted on the shaft 112 between the radial bearing 110 and the platen 118 so that the platen is biased toward the container gripping position.

For stabilizing purposes a portion of the top surface 140 of the turntable 42 and the bottom surface 142 of the platen 118 include a nonslip surface 144 of polyurethane or silicon rubber. The surface may be painted on, glued on or poured in a fluid state into a cavity formed in the turntable 42 and the platen 118 as shown in FIG. 6, when it hardens.

Figure 5:
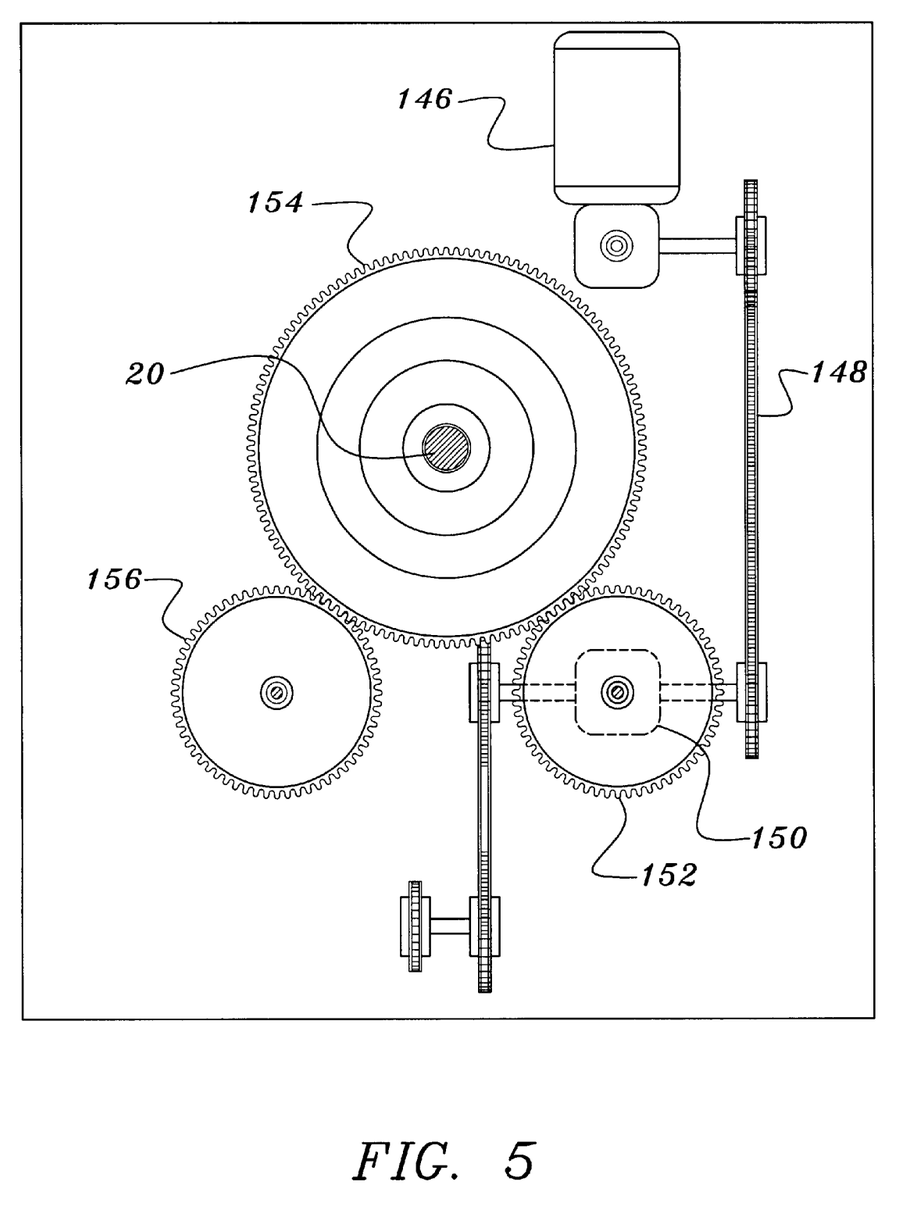
FIG. 5 is a cross-sectional plan of the invention of FIG. 1 taken along line 5—5 of FIG. 1.

FIG. 5 discloses the s for rotating the central column of the Rotary Orienter 10. This apparatus is mounted to the support frame 32 below the surface 33 and comprises a motor 146, a drive belt 148, a gear box 150 and three gears 152,154 and 156. The gear 154 rotates the central column 20, the gear 152 rotates the shaft attached to the exit star wheel 29 and the gear 156 rotates the shaft attached to the entrance star wheel 28. The belt drive also operates the feed screw 26. One skilled in the art will be able to determine the pitch and size of the gears necessary to rotate the star wheels 28 at 29 in synchronization with the rotation of the central column 20 and the rotation of the feed screw 26.

Pressurized air may be provided separately by any well-known pneumatic system, or from a pneumatic system that is present in many production plants. The air need only be sufficient to operate any suitable air cylinders. Systems using sensors to control pneumatic cylinders are well-known in the art and those skilled in the art will be able to select appropriate equipment for the described purpose.

Having thus set forth a preferred construction for the current invention, it is to be remembered that this construction is but a preferred embodiment. Attention is now invited to a description of the use of the rotary orienter 10. The rotary orienter 10 is used as an element of a production line, for example production lines that fill and/or cap containers, label articles or containers and/or inspect articles or containers. For the purposes of illustration, containers that are to be labeled will be used as an example for discussion of the use of the invention. The rotary orienter 10 illustrated in the drawings is particularly suited for orienting four sided containers having a generally square cross-section. Articles with fewer sides may be oriented in the illustrated device; however, articles with a greater number of sides than four will require additional sensors and actuators. The rotary orienter 10 orients articles through a series of steps with each step comprising an examination of the article by a sensor to determine the orientation of the article and rotation of the article if it is improperly oriented. The rotary orienter 10 usually must have the capability of processing a number of steps that is equal to the number of sides minus one.

The rotary orienter 10 is placed in a production line and is connected to the other equipment by a pair of linear conveyor belts 22a and 22b. Open containers are federal onto the conveyor belts 22 and are captured between the guide 24 and the feed screw 26. As can be seen in the drawing FIG. 2, on the conveyor belt 22a, the container handles 14 are oriented to a maximum of four different directions. The screw feeder 26 ensures that the containers are federal to the rotary orienter 10 sufficiently spaced apart so that they may be readily handled by the entrance star wheel 28. The entrance star wheel 28 places the containers 12 centered upon an empty turntable 42 as the turntable 42 is rotated about the central column 20 in the clockwise direction. For this example, the objective is to have all container handles 14 oriented at the 9:00 position in relation to a clock face, as a seen on the exit conveyor 22b that is adjacent to the exit star wheel 29.

For ease of understanding, each station 18 is labeled a–h, each container placed on a station is labeled 12a–g, and each handle is identified as 14a–g. At the station 18a as the container 14a passes the sensor 104a the sensor would see the handle 14a in the wrong position and will signal the actuator 96a to extend its piston 100 as station 18a approaches the actuator 96a. Container 12a will be in the incorrect position each time it is scanned by the sensors 104a–c and the container will be rotated 270 degrees to put its handle 14a in the proper orientation.

In another example, it can be seen that the container 12c was determined to be in the wrong orientation by sensor 96a and it is in the process of being rotated in a clockwise direction. In this case the container 19c will now be in the correct position and sensors 104b and 104c will not signal their actuators 96b and 96c respectively.

In an another example, actuator 96b has extended and engaged the arm of station 18d and the turntable of station 18d is commencing to rotate in the clockwise direction. Once the rotation is complete the container will be properly oriented, and sensor 104c will not signal the actuator 96c.

Figure 7:
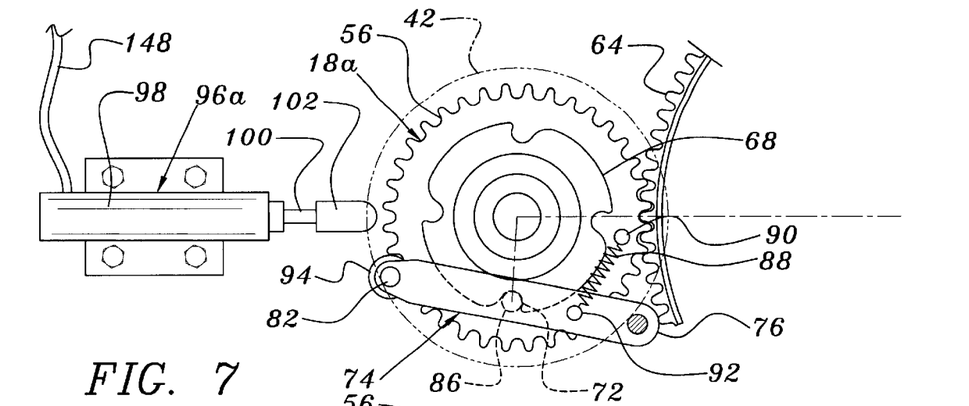
FIG. 7 is a detailed plan of the indexing assembly of the invention of FIG. 1.

FIGS. 7–12 illustrate the steps taken once a signal is sent by sensor 104a to a relay (not shown) opening the pneumatic line 148 to its partnered actuator 96a. In FIG. 7 the piston 100 of actuator 96a has extended. The projection 86 of the arm 74 is engaging one of the detents 72 locking platform 42 and preventing it from rotating even though the teeth of gear 56 are engaging the teeth of the flexi-rack 64.

Figure 8:
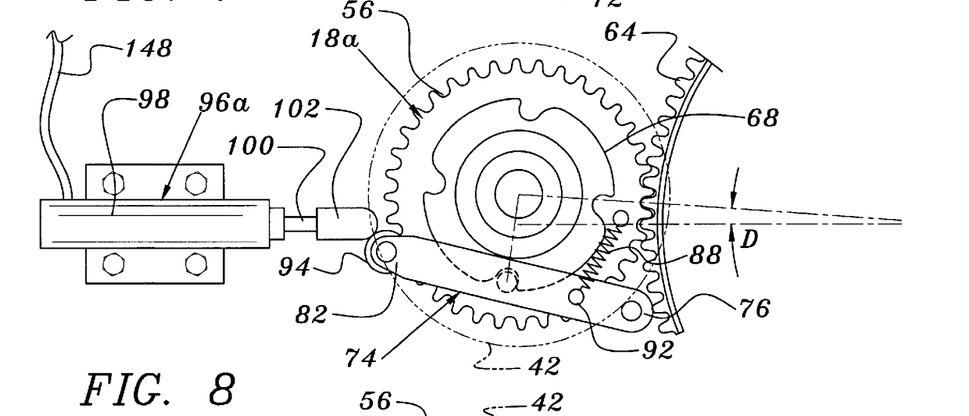
FIG. 8 is a detailed plan of the indexing assembly of FIG. 7, illustrating rotation of the rotary orienter and engagement of the arm with the actuator.

In FIG. 8 the station 18 has advanced by the angle D about the axis A of the central column 20. The first end 102 of the piston 100 has engaged the wheel 94 that is attached to the first end 76 of the arm 74. However, the indexing wheel 68 is still locked and the slip clutch 54 permits the gear 56 to continue rotating.

Figure 9:
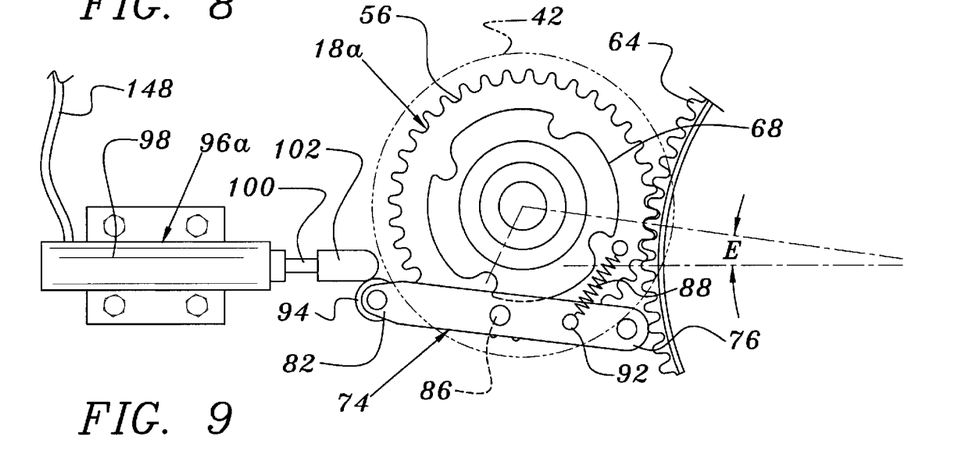
FIG. 9 is a detailed plan of the indexing assembly of FIG. 8, illustrating further rotation of the rotary orienter and disengagement of the arm from the indexing wheel.

In FIG. 9, the station 18 has now advanced through the angle E. The first end 102 of the piston 100 remains in contact with the first end 76 of the arm 74. The arm now has pivoted against the spring 88 releasing the indexing wheel 68 for rotation of the turntable 42 about the axis B.

Figure 10:
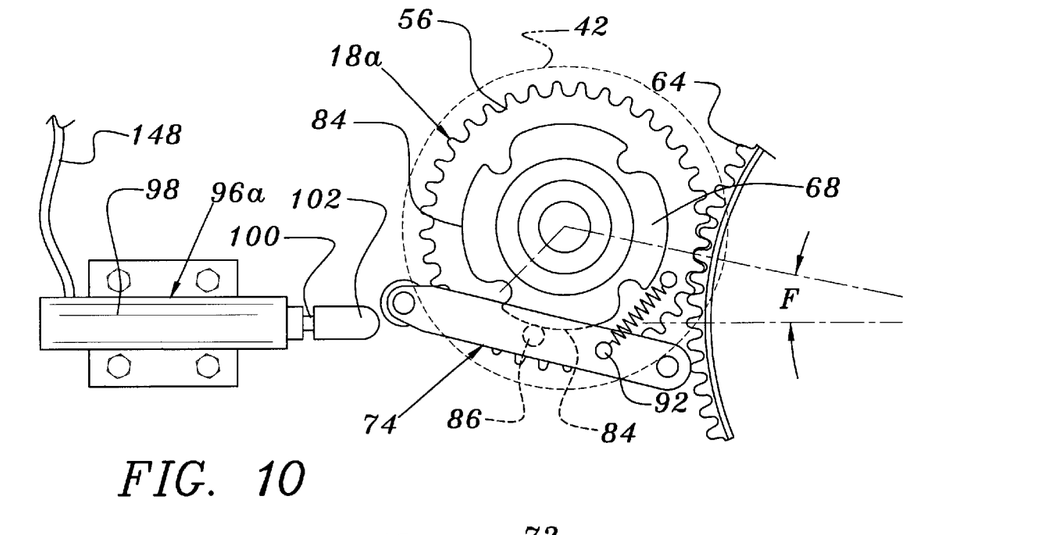
FIG. 10 is a detailed plan of the indexing assembly of FIG. 9, illustrating further rotation of the rotary orienter and retraction of the actuator.

In FIG. 10 the station 18 has advanced through the angle F. The relay has automatically closed after a brief period of time and the air has been released so that the piston 100 has retracted releasing the arm 74. The arm 74 is biased inwardly by the spring 88, so that the projection 86 rests against the peripheral edge 84 of the indexing wheel 68.

Figure 11:
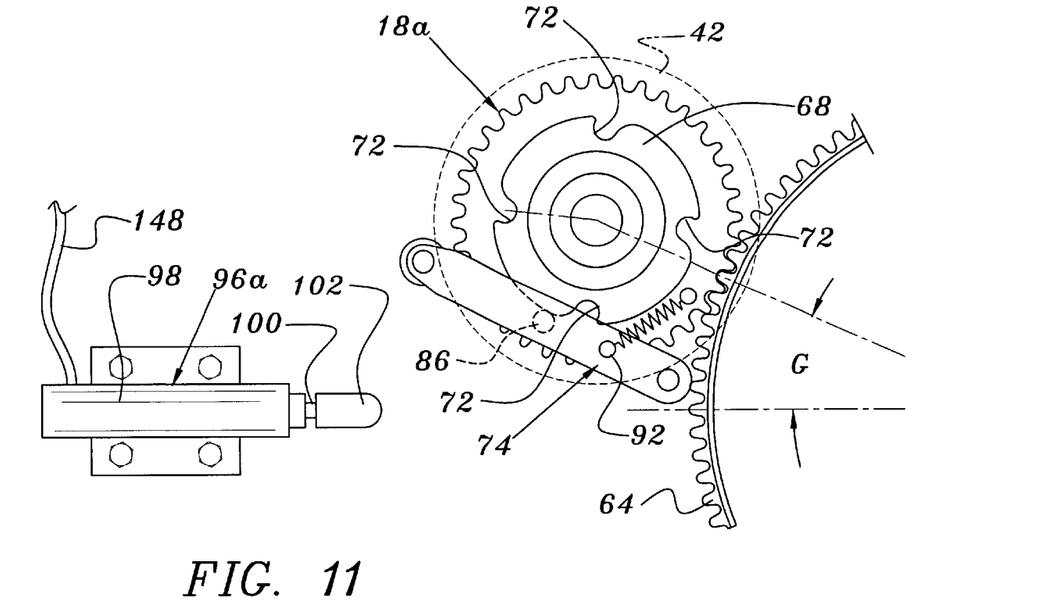
FIG. 11 is a detailed plan of the indexing assembly of FIG. 10, illustrating further rotation of the rotary orienter and engagement of the arm with the indexing wheel.

In FIG. 11, the station 18 has moved through angle G. The indexing wheel continues to rotate in the clockwise direction with the next indent 72 approaching the projection 86.

Figure 12:
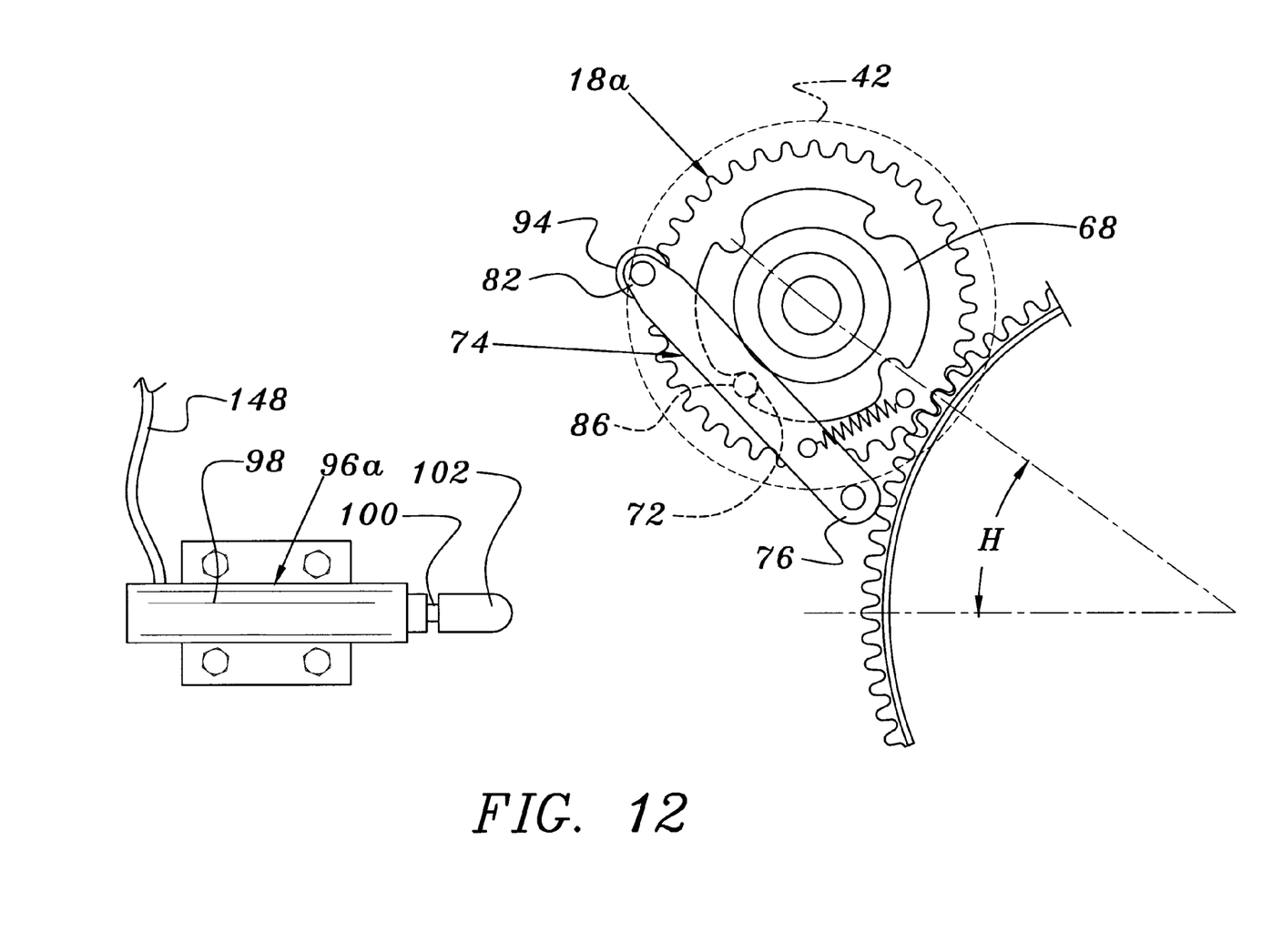
FIG. 12 is a detailed plan of the indexing assembly of FIG. 11, illustrating further rotation of the rotary orienter and re-engagement of the arm with a detent of the indexing wheel.

In FIG. 12, the station 18 has now rotated through angle H. The projection 86 has engaged the next detent 72 locking the indexing wheel 68 to prevent it from rotating, which also prevents the turntable 42 from rotating. The turntable 42, and the container residing thereon, have rotated through 90 degrees. If the container is oriented correctly, the next sensor 104b will not signal the corresponding relay to extend the piston of the next actuator 96b. It the container is incorrectly oriented, the next sensor 104b will signal the corresponding relay to extend the piston 100 of the next actuator 96b for engagement with the arm of station 18a for rotation of turntable 42, along with the container residing thereon, through an additional 90 degrees.

As shown in FIG. 2, containers 12 are continuously removed from the rotary orienter 10 by the exit star wheel 29, and are placed on the exit linear conveyor 22b. The containers 12 are then transported to the next apparatus for work to be done thereon.

While the foregoing describes a particularly preferred embodiment of the present invention it is to be understood that numerous variations and modifications of this structure will readily occur to those skilled in the art. Accordingly, the foregoing description is to be considered illustrative only of the principles of this invention and is not to be considered limitative thereof, the scope of the invention being determined solely by the claims appended hereto.

Now that the invention has been described,
What is claimed is:

1. A rotary orienter for moving articles into a predetermined orientation comprising:
    a support frame;
    a central column having a longitudinal axis, said column being mounted to said support frame for rotation of said column about said longitudinal axis of said column;
    means for rotating said central column;
    at least one station connected to said column for rotation with said column, said station comprising;
        a spindle having a longitudinal axis, said spindle being rotatably connected to said column for rotation about said longitudinal axis of said spindle, said spindle having a first end and a second end;
        a turntable being attached to said first end of said spindle;
        means for rotating said spindle being connected to said support frame and being connected to said spindle;
        a slip clutch mounted on said spindle and connected to said means for rotating said spindle;
        an indexing wheel mounted on said spindle, said indexing wheel having at least two detents formed therein;
        an arm having a first end pivotally mounted to said support frame and a second end extending free, said arm being engageable with said detents of said indexing wheel such that when so engaged, said indexing wheel is prevented from rotating with said spindle;
    at least one actuator connected to said support frame, said actuator being selectively engageable with said arm such that said arm is disengaged from one of said detents of said indexing wheel when said actuator engages said arm, whereby said turntable rotates until said arm is released by said actuator and said arm engages another one of said at least two detents;
    means for moving articles onto said turntable; and
    at least one sensor mounted to said support frame for determining the orientation of an article on said turntable, said sensor activating said actuator when the orientation of an article is not in accordance with a predetermined orientation.

2. A rotary orienter as in claim 1 wherein said means for rotating said spindle further comprises:
    a gear mounted on said spindle proximal said second end of said spindle;
    gear teeth connected to said support frame for engagement with and rotation of said gear as said spindle rotates about said column, whereby said spindle is rotated about said longitudinal axis of said spindle.

3. A rotary orienter as in claim 1 wherein said actuator further comprises:
    a pneumatic cylinder having a piston shaft extending outwardly therefrom, said cylinder being attached to said support frame, such that when said cylinder is activated said piston shaft engages said arm releasing said arm from said detent in said indexing wheel as said central column rotates.

4. A rotary orienter as in claim 1 further comprising:
    a means for stabilizing an article on said turntable.

5. A rotary orienter as in claim 4, wherein said means for stabilizing an article on said turntable comprises:
    a shaft having a longitudinal axis, said shaft being rotatably connected to said column for rotation about said longitudinal axis of said shaft, said longitudinal axis of said shaft being generally coincident with said longitudinal axis of said spindle, said shaft having a first end and a second end;
    a platen attached to said first end of said shaft; and
    a lifting means being attached to said second end of said shaft.

6. A rotary orienter as in claim 5, wherein said lifting means comprises:
    a lever having a first end pivotally attached to said support frame, a second end having a cam follower mounted thereon and said lever being pivotally attached to said shaft intermediate said first and second ends of said lever; and
    a cam connected to said support frame so that when said cam follower engages said cam said cam is selectively raised as said shaft rotates about said column.

* * * * *